Sept. 28, 1965    R. C. WOODWARD, JR    3,209,184
AIR COOLED EDDY CURRENT COUPLING
Filed Nov. 27, 1961    3 Sheets-Sheet 1

INVENTOR.
RICHARD C. WOODWARD, JR.
BY
Flam and Flam
ATTORNEYS.

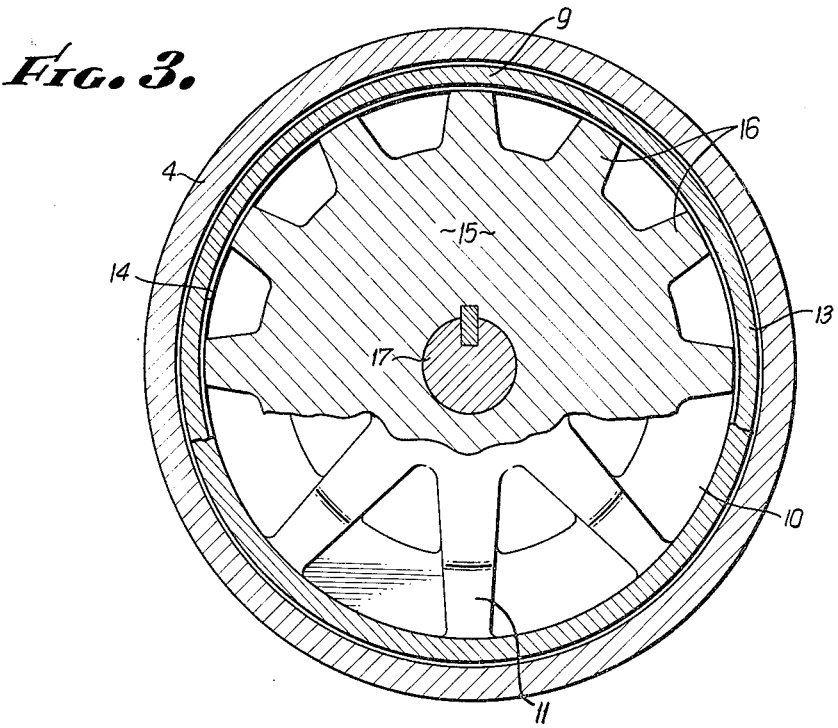
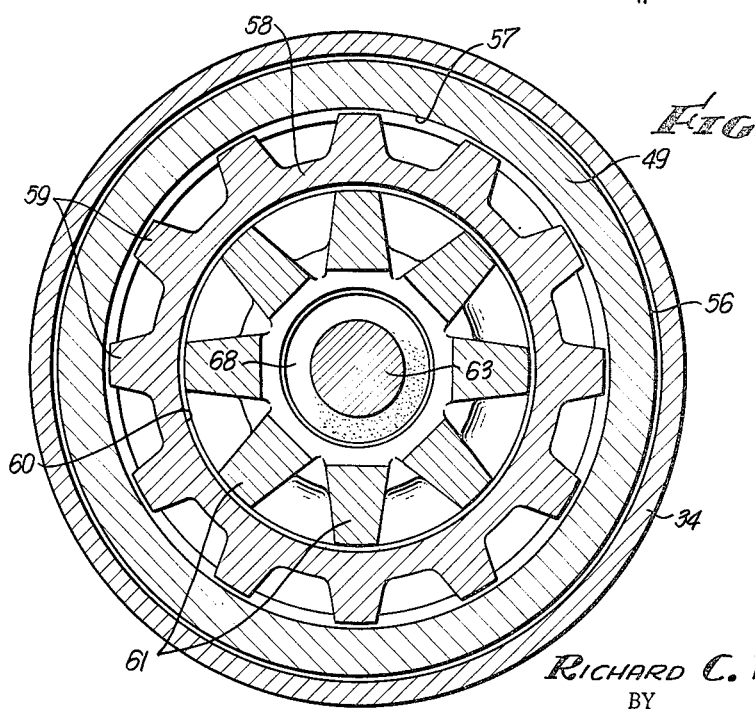

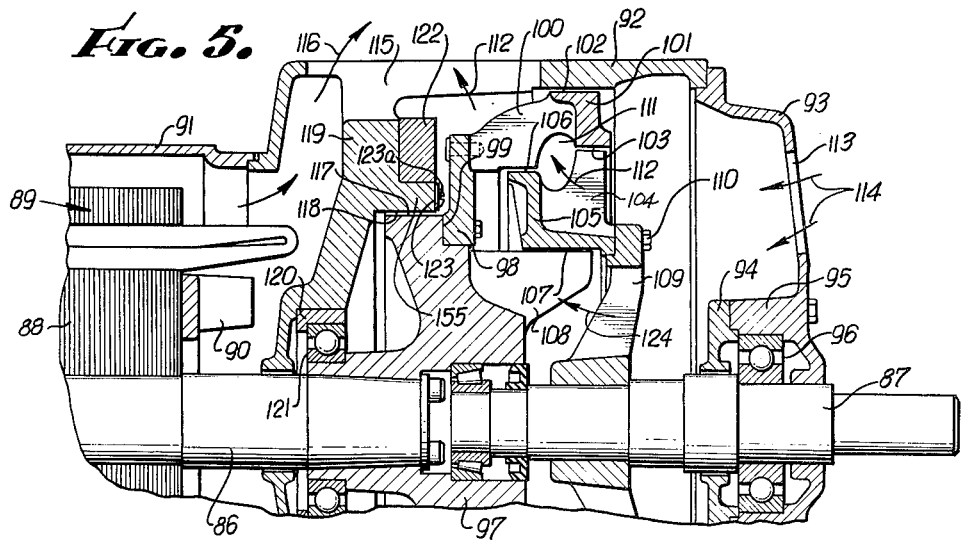
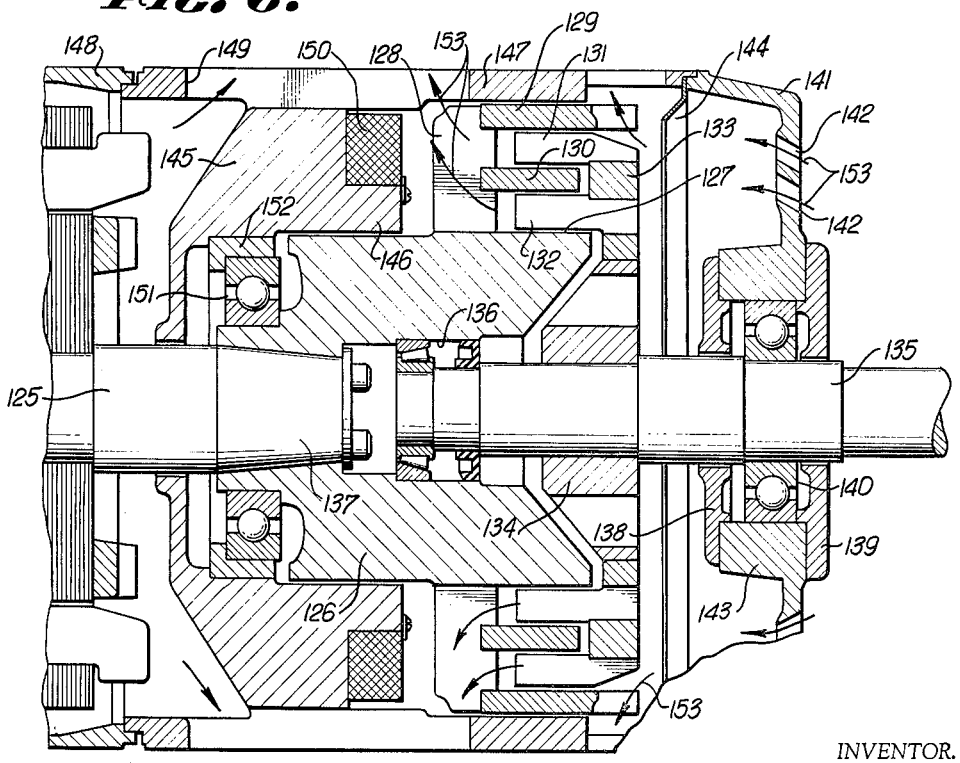

United States Patent Office 3,209,184
Patented Sept. 28, 1965

3,209,184
AIR COOLED EDDY CURRENT COUPLING
Richard C. Woodward, Jr., Fullerton, Calif., assignor, by mesne assignments, to Emerson Electric Co., a corporation of Missouri
Filed Nov. 27, 1961, Ser. No. 155,112
14 Claims. (Cl. 310—103)

This invention relates to eddy current couplings.

Such couplings are now well-known. They consist usually of relatively angularly moving parts of magnetic material, one having radial teeth and the other having a cylindrical surface forming a gap with the teeth. Either of the parts may serve as the driving element and the other the driven element. When magnetic flux is produced across the gap between the relatively rotating elements, eddy currents are produced which create a torque or drag between the elements. Since these phenomena are now well-known, further discussion of the theory of operation is unnecessary.

Due to the flow of current in one or more of the elements, substantial heat is generated therein, which must be dissipated. Heat transfer to a flowing stream of water has been effective; but such provisions results in additional loads upon the source of motion, and sealing provisions are necessary for confining the water to the desired path.

It is one of the objects of this invention to provide a simple and effective means for cooling the coupling by passing air over and around the coupling elements, preferably in divided streams.

It is another object of this invention to provide a compact structure for a power unit including a driving electric motor and the eddy current coupling, and which can be effectively air cooled even when the coupling transmits a large amount of torque from the motor to the output shaft.

This invention possesses many other advantages, and has other objects which may be made more clearly apparent from a consideration of several embodiments of the invention. For this purpose, there are shown a few forms in the drawings accompanying and forming part of the present specification, and which drawings, unless as otherwise indicated, are true scale. These forms will now be described in detail, illustrating the general principles of the invention; but it is to be understood that this detailed description is not to be taken in a limiting sense, since the scope of the invention is best defined by the appended claims.

Referring to the drawings:

FIG. 3 is a view, mainly in section, taken on a plane corresponding to line 3—3 of FIG. 1;

FIG. 4 is a sectional view, taken along a plane corresponding to line 4—4 of FIG. 2; and FIGS. 5 and 6 are views similar to FIG. 2, of further modifications of the invention.

Figure 1:
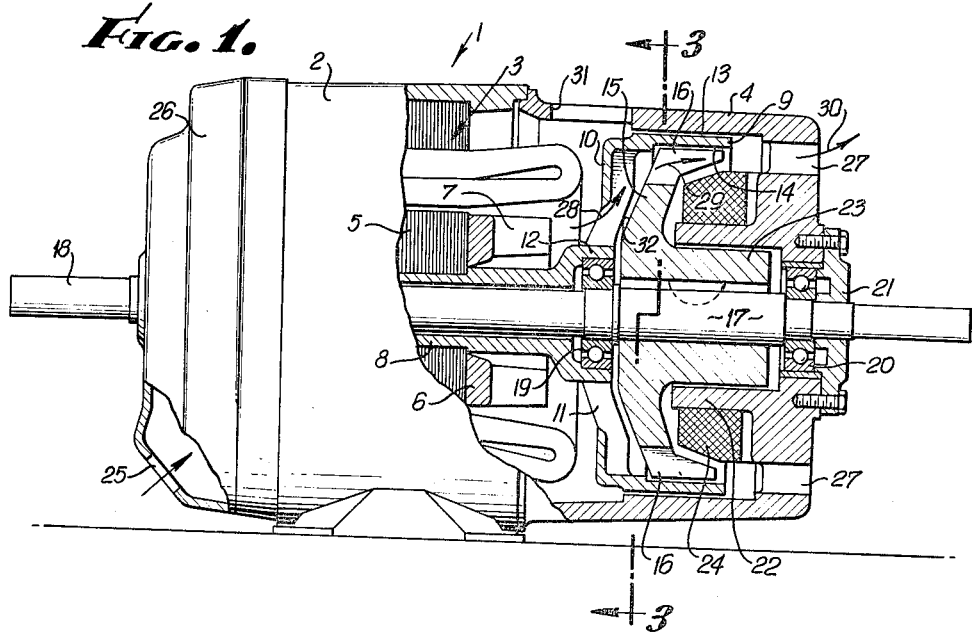
FIGURE 1 is a side view, partly in longitudinal section, of an eddy current coupling incorporating the invention.

In FIGS. 1 and 3, a casing structure 1 is provided. This casing structure includes a housing 2 for an electric motor structure 3 that operates the coupling. A bearing bracket 4 of extended length is appropriately joined to the housing 2 to complete the casing. The motor 3 may be of the induction motor type having a squirrel cage rotor 5 with end rings 6. From the end rings project fan blades 7 for circulating air into and out of the structure 1.

Since the construction of motors of this type is now well-known, further description thereof is deemed unnecessary.

The rotor 5 is keyed or otherwise joined to a hollow shaft 8. This shaft constitutes the driving means for an eddy current drum 9. This drum 9 of generally annular form, is provided with an inwardly directed flange 10 and arms 11 integrally joined to the enlarged end 12 of the hollow shaft 8.

The drum 9 has an exterior cylindrical surface 13 and an interior cylindrical surface 14. The surface 13 forms an air gap with an interior cylindrical surface of the bearing bracket 4. This bracket is made of magnetic material and thus provides a magnetic air gap between the stationary part of the coupling structure and the drum 9.

Drum 9 is in cooperative relationship with an angularly movable coupling element 15 that is provided with a number of radially arranged teeth 16 (FIG. 3) of magnetic material. This rotary coupling element is keyed to a shaft 17 forming, in this instance, the output shaft of the coupling structure. This shaft extends through the hollow shaft 8 to provide an extension 18 at the left-hand end of the structure, so that the coupling may appropriately drive a load from either end of the device.

The left-hand end of shaft 8 is appropirately supported by a bearing structure located on the end bracket of casing 1. Its right-hand end 12 is provided with an appropriate bearing structure 19 abutting a shoulder on shaft 17 and supported between the enlarged end 12 of the shaft 8 and the driven shaft 17. The right-hand end of shaft 17 is similarly mounted on appropriate bearing structure 20 supported in the bearing bracket 4. A cap 21 attached to bracket 4 serves to hold the bearing structure 20 in place.

The bearing bracket 4 has an inwardly directed flange 22 having an interior cylindrical surface forming an air gap with the cylindrical surface of the hub 23 formed integrally with the element 15. Disposed around this flange is a stationary coil 24 that provides the magnetomotive force for the coupling.

Rotation of the drum 9 by energization of the electric motor 3 serves in a well-known manner to set up eddy currents, to cause rotation of the element 15, so that the output shaft 17 is rotated. The magnetic circuit through the coupling elements 4 and 15, produced by the coil 24, includes the flange 22, hub 23, coupling member 15, teeth 16, drum 9, and bearing bracket 4. Air gaps are formed between the flange 22 and hub 23.

Cooling air is directed over the cooperating surfaces of the coupling elements. Air may pass into the motor housing 2 by way of an inlet opening 25 located in the lower left-hand corner of the left-hand bearing bracket 26. Additional openings may be provided in this bearing bracket. The fan blades 7 serve to circulate the air past the heated parts of the motor 3 as well as past the interior surface of the flange 10, between the teeth 16, and out through outlet openings 27 in the right-hand bearing bracket 4. The arrows 28, 29 and 30 indicate the flow of air in this manner.

Air is also passed through one or more outlet openings 31 in the flange portion of the bearing bracket 4.

The heat generated by the production of eddy currents in the drum 9 is effectively dissipated to the external atmosphere by the air flow hereinabove described. The stream of air indicated by the arrows 28, 29 and 30 is confined to the desired path by the aid of a sloping surface 32 formed on the left-hand side of the coupling element 15, which cooperates to define an air channel with the flange 10.

In order to confine the magnetic flux to the path outlined hereinabove, the housing 2 is preferably made of non-magnetic material.

Figure 2:
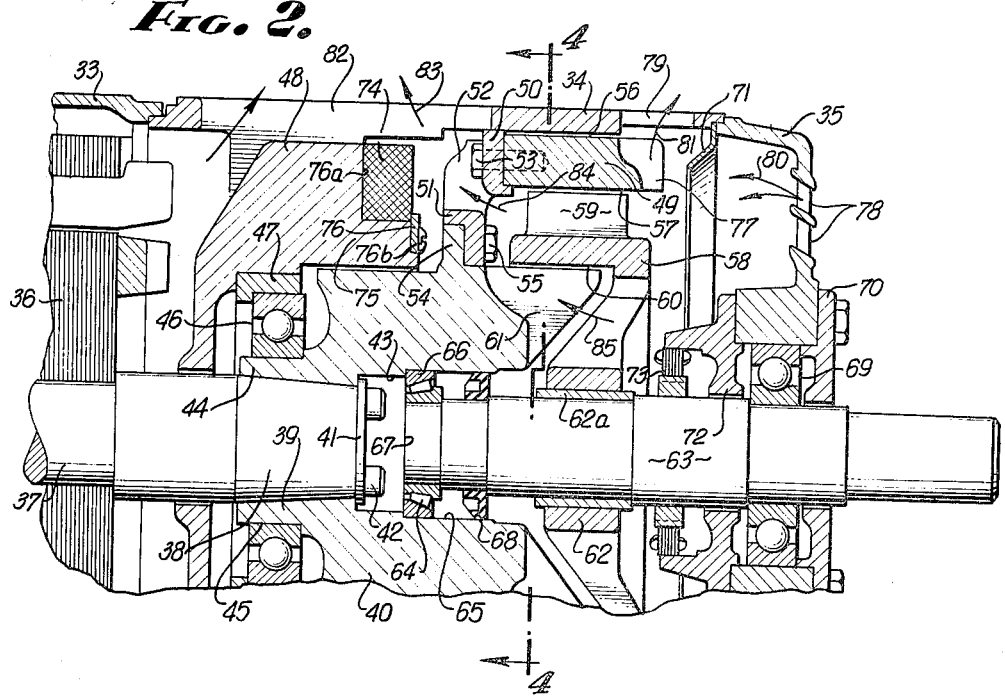
FIG. 2 is a fragmentary longitudinal sectional view of a modified form of the coupling.

In the form shown in FIGS. 2 and 4, the casing includes a motor housing 33, an auxiliary casing 34 and, an end bracket 35. This end bracket is made of non-magnetic material.

As before, the rotor 36 is mounted on the driving shaft 37. The left-hand end of this shaft 37 is appropriately rotatably supported by the housing structure 33. The righthand end 38 is slightly tapered so as to interfit the hub 39 of a spider 40. A collar 41 and machine screws 42 engage the right-hand end of the tapered portion 38 as well as that flat surface of a counterbore 43 in the spider 40 to hold the spider firmly in place on the tapered portion 38.

A left-hand extension 44 of the spider 40 has an external cylindrical surface 45 for accommodating the inner race of ball bearings 46, by which the right-hand end of the shaft 37 is supported. The outer race is mounted in ring 47 appropriately supported by annular member 48 formed integrally on the interior of the casing member 34.

A pair of non-magnetic rings 50 and 51 joined together by a series of ribs 52 serve to support the drum 49 upon the spider 40. Ring 50 is attached to the left-hand end of drum 49 by a series of screws 53; and ring 51 is mounted on the flange 54 of spider 40 by the aid of the screws 55. Each of these rings 50, 51 has a flange respectively overlying the inner surface 57 of drum 49, and the upper surface of flange 54.

The exterior cylindrical surface 56 of the drum 49 forms an air gap with the casing member 34. The interior cylindrical surface 57 forms an air gap with a toothed coupling member 58 (FIG. 4). This coupling member 58 has teeth 59 projecting radially outwardly. The inner cylindrical surface 60 of the coupling member 58 forms an air gap with the teeth 61 integrally mounted on the spider 40.

The hub 62 of the driven coupling member 58 is appropriately fastened to the output shaft 63. A sleeve 62a of non-magnetic material is included between the hub 62 and the shaft 63. This output shaft 63 has its left-hand end appropriately rotatably supported as by the conical roller bearings 64 mounted in the recess or counterbore 65 of the spider 40. The outer race 66 abuts a shoulder 67 formed at the bottom of counterbore 65. A grease sealing structure 68 is also mounted between the shaft 63 and the recess 65.

The shaft 63 at its right-hand end is supported by the ball bearing structure 69 appropriately mounted in the end bracket 35 and held in place by the cap 70. A deflector 71 is confined between the cooperating flanges of the casing member 34 and the bearing bracket 35.

A cap 72 is mounted by the bearing bracket 35 for supporting a tachometer generator 73.

In order to provide the magnetic flux, an annular coil 74 is mounted on the flange 75 of ring 48. This coil is held in place by a retainer 76, against a shoulder 76a of ring 48, screws 76b hold the retainer in place.

The path of the flux includes this ring 48, an air gap between the flange 75 and the spider 40, the spider 40, teeth 61, element 58, teeth 59 and drum 49 to the casing member 34.

The drum 49 is provided with projections 77 forming fan blades for circulating the air from inlet passages 78 in end bracket 35, past the deflector 71 and out through one or more outlet openings 79 in casing member 34. This path is indicated by the arrows 80 and 81. Another path passes between the teeth 59 and outwardly between the rings 50 and 51 and through an outlet opening or openings 82 in the casing member 34. This is indicated by the arrows 83 and 84. Air also passes as indicated by arrow 85 past the teeth 61 and then between the rings 50 and 51 through the same opening 82.

In the form illustrated in FIG. 5, an input shaft 86 and an output shaft 87 are arranged substantially as in FIG. 2. The input shaft 86 carries the rotor 88 of an induction motor 89. As before the rotor 88 carries fan blades 90.

The motor housing 91 is appropriately joined to an intermediate casing member 92 which may be made of magnetic material. An end bracket 93 made of non-magnetic metal is appropriately joined to the casing member 92. A cap 94 is provided on the inner surface of the bearing hub 95, maintaining the ball bearing 96 in appropriate relationship to the shaft 87.

In this instance a spider 97 is mounted on the shaft 86. The spider is made of magnetic material. It carries a non-magnetic ring 98 appropriately bolted to an annular surface 99 formed on the spider 97. This non-magnetic ring 98 is similarly bolted to the left-hand edges of teeth 100 integrally formed with the drum member 101 of magnetic material. This drum member 101 has an outer peripheral surface 102 forming an air gap with the interior of casing 92. It has an inner cylindrical surface 103 cooperating with teeth 104 formed integrally with the drum structure 105. This drum structure 105 has an exterior periphery 106 forming an air gap with teeth 100. This air gap is of smaller radius than the air gap formed between the drum 101 and the casing member 92.

The drum 105 also has a somewhat extended inner cylindrical surface 107 which forms an air gap with teeth 108 integrally formed on the spider 97.

The drum 105 is mounted on a non-magnetic bracket 109 appropriately keyed to the shaft 87. Bolts 110 serve to fasten the drum 105 to the bracket 109.

The teeth 100 and 104 are so arranged as to leave a substantial opening 111 between them for the free passage of air as indicated by arrows 112. This air may pass into the casing through inlet opening or openings 113 in bracket 93, as indicated by arrows 114. The air passes out through one or more outlet openings 115 in the casing member 92. Air also passes outwardly as indicated by arrow 116 through the openings 115 by virtue of the air forced therethrough by fan blades 90. A stream of air indicated by arrow 124 also flows past teeth 108.

To complete the magnetic circuit, a cylindrical surface 117 of spider 97 forms an air gap with the interior surface 118 of a non-rotary member or ring 119. This non-rotary member may be integrally formed with the casing member 92. It provides a support for the ring 120 that supports the bearing structure 121 for the input shaft 86.

The member 119 has a flange 155 over which is disposed the exciting coil 122. This exciting coil may be held in place by the ring 123 held against the outer edge of the coil 122 and by aid of the screw 123a; this is similar to the structure shown in FIG. 2.

The magnetic circuit extends through the casing member 92, flange 155, spider 97 and teeth 108; thence the magnetic circuit divides; one path extends through the air gap to the drum 105, thence to the cylindrical surface 106 of the drum 105, through the teeth 100, drum 101 and back to the casing member 92. The other path extends from durm 105, teeth 104, drum 101, to member 92.

Air passes between the teeth 104 and 100 as well as through the spokes of bracket 109, through the teeth 108 as indicated by arrow 124. There is ample air circulation due to the fanning action of the teeth 108, 104 and 100 so as to maintain the coupling elements cool. Since the coupling elements are in direct contact with the streams of air the cooling is effective, making it possible to use the coupling elements for the transmission of a large amount of power.

In the form of the invention illustrated in FIG. 6, the input shaft 125 carries the magnetic member 126 forming a cylindrical surface 127. Axially spaced from the cylindrical surface 127 are a series of arms 128, which are made of non-magnetic material and fastened as by welding to the exterior surface of the drum 126.

These arms 128 support an outer ring 129 made of magnetic material and forming drum surfaces. Radially spaced inwardly of ring 129, and supported by the arms 128 is another ring 130 annularly arranged within the ring 129 and forming drum surfaces.

Interleaving the rings 128 and 130 is a series of teeth 131. Interleaved between the drum or ring 130 and member 126 is another series of teeth 132. These teeth 131 and 132 form air gaps at the respective cooperating ring elements. They are attached as by the non-magnetic ring 133 to a bracket 134 securely attached to the output shaft 135.

This output shaft 135 is appropriately supported as before within the recess 136 of member 126. The drum 126 as before is attached to the conical extension 137 of the input shaft 125.

Inner and outer caps 138 and 139 hold the bearing structure 140 for the output shaft in accurate spaced position.

The end bracket 141 is provided with air inlet apertures 142 and is made of non-magnetic material. The caps 138 and 139 engage opposite surfaces of the integrally formed hub 143 of bracket 141. A deflector 144, similar to that shown in FIG. 2 may also be provided.

Completing the magnetic circuit for the coupling there is a magnetic member in ring 145 integrally formed with casing member 147, and a flange 146. Member 147 is attached to motor housing 148. Casing member 147 is formed with one or more outlet apertures 149 for the air flow.

An annular coil 150 is supported appropriately on the flange 146 which forms an air gap with the member 126. A ball bearing structure 151 mounted in ring 152 is provided for the input shaft 125.

The magnetic circuit can be traced from the magnetic casing member 147, element 145, member 126, teeth 132, drum 130, teeth 131, drum 129 and casing member 147.

The air flow path as indicated by arrows 153 passes between the drums 129 and 130, and between the arms 128 to find their exit through the openings 149.

In this form of the invention there are three drum structures and two interleaved toothed structures providing a greater capacity for the transmission of power.

The inventor claims:

1. In an eddy current coupling structure: at least one pair of elements adapted to be magnetically coupled; means supporting said elements for rotation about a common axis; one of said elements having an annular surface, and another of said elements having teeth opposed to said annular surface, there being channels between the teeth open at opposite ends; a nonrotary coil support; a coil mounted on the support; said support of magnetically permeable material having two annular surfaces forming magnetic flux transfer air gaps cooperable with the elements, at least one of said annular air gaps being spaced from the coil; said support having air ventilating openings extending through said support and located between the said one of said air gaps and the coil and communicating with corresponding ends of said channels; and means for inducing currents of air through said channels.

2. The combination as set forth in claim 1 in which said support forms part of a casing for the coupling.

3. In an eddy current coupling structure: a coil support made of magnetically permeable material having a pair of annular pole forming parts spaced from each other and extending about a common axis; a coil mounted on the support and oppositely magnetically polarizing said annular pole forming parts; a pair of elements adapted to be coupled; means mounting said elements for independent rotation about said axis; one of said elements having an annular eddy current surface and the other of said elements having teeth opposed to said eddy current surface; there being channels formed between the teeth and open at opposite ends; at least one of said elements having parts cooperable with the poles of said support for magnetizing the teeth and eddy current surface; said support having air ventilating openings extending through said support and located between one of its pole forming parts and the coil for establishing communication to corresponding first ends of said channels; and means cooperating with the other ends of said channels for completing an air ventilating path for said coupling.

4. In an eddy current coupling structure: a coil support made of magnetically permeable material having a pair of annular pole forming parts spaced from each other and extending about a common axis; a coil mounted on the support and oppositely magnetically polarizing said annular pole forming parts; a pair of elements adapted to be coupled; means mounting said elements for independent rotation about said axis; one of said elements having magnetically isolated parts respectively opposed to said pole forming parts and spaced from each other by perforate nonmagnetic mounting means; the other of said elements being interposed between said magnetically isolated parts; at least one of said elements having teeth opposed to eddy current surface of the other of the elements, said teeth forming channels for passage of cooling air between the teeth and past said perforate mounting means; said support having openings extending through said support and located between the coil and one of said pole forming parts for conducting cooling air with respect to corresponding ends of said channels; and means for completing an air circulation path through said channels.

5. The combination as set forth in claim 1, in which there are two sets of clutch elements, comprising an outer drum element, a toothed element telescoping within the drum element, and having an annular portion forming a second drum element, and a second toothed element, said second toothed element being connected to the outer drum element; and in which air passages are formed for passing air between each set of drum surfaces and teeth.

6. The combination as set forth in claim 1, in which there are two sets of clutch elements, comprising an outer drum element, a toothed element telescoping within the drum element, and having an annular portion forming a second drum element, and a second toothed element, said second toothed element being connected to the outer drum element; and in which air passages are formed for passing air between each set of drum surfaces and teeth; and the casing has end brackets each of which is provided with inlet openings, there being an outlet opening in the casing wall intermediate said inlet openings.

7. The combination as set forth in claim 1, in which the first element is a drum with an internal surface cooperating with the teeth of the other element, said drum having a second series of teeth axially spaced from the first set and directed radially inwardly of the gap formed between the elements, and a drum portion carried by the second element cooperating and forming an air gap with the second series of teeth, a third series of teeth mechanically joined to the first element; said first element having a second cylindrical surface forming another air gap, the air path being past all three series of teeth.

8. The combination as set forth in claim 1, in which the first element is a drum with an internal surface cooperating with the teeth of the other element, said drum having a second series of teeth axially spaced from the first set and directed radially inwardly of the gap formed between the elements, and a drum portion carried by the second element cooperating and forming an air gap with the second series of teeth, a third series of teeth mechanically joined to the first element; said first element having a second cylindrical surface forming another air gap, the air path being past all three series of teeth; and in which there are two magnetic paths in parallel respectively between the third series of teeth and the other two series of teeth.

9. The combination as set forth in claim 1, in which there are two series of teeth and a drum carried by the first element and interposed between the two series of teeth, and means non-magnetically supporting said two series of teeth.

10. The combination as set forth in claim 1, in which there are two series of teeth and a drum carried by the first element and interposed between the two series of teeth, and means non-magnetically supporting said two series of teeth, said casing having end brackets in which said inlet openings are located; the casing having peripheral outlet openings.

11. In an eddy current clutch structure: a first rotary clutch element made of magnetic material and forming an interior drum surface; said first element having an axially offset first series of teeth directed toward the axis of rotation and having an interior diameter less than that of the interior drum surface; a second series of teeth directed radially outward toward said first set but spaced therefrom, and non-magnetically supported by said first element with respect to the first series of teeth; and a cooperating second clutch element of magnetic material, having a third series of teeth cooperating with the interior drum surface, as well as a second interior drum surface cooperating with the second series of teeth, and an exterior drum surface cooperating with the first series of teeth; means for co-axially but separately mounting said elements; and means for driving one of the elements.

12. The combination as set forth in claim 11, with the addition of a casing completing the magnetic circuit in parallel respectively through the first series of teeth, and through the other two series of teeth.

13. The combination as set forth in claim 11, with the addition of a casing completing the magnetic circuit in parallel respectively through the first series of teeth, and through the other two series of teeth; and means producing a cooling flow of air between all of the teeth of all of the series.

14. The combination as set forth in claim 11, with the addition of a casing completing the magnetic circuit in parallel respectively through the first series of teeth, including inlet openings and outlet openings in the wall of the casing.

References Cited by the Examiner
UNITED STATES PATENTS

| | | | |
|---|---|---|---|
| 2,817,029 | 12/57 | Jaeschke | 310—105 |
| 3,012,160 | 12/61 | Sturzenegger | 310—105 |
| 3,020,427 | 2/62 | Wheeler et al. | 310—59 |
| 3,047,754 | 7/62 | Jaeschke | 310—105 |

MILTON O. HIRSHFIELD, *Primary Examiner.*